United States Patent
Beall et al.

(10) Patent No.: US 8,231,701 B2
(45) Date of Patent: Jul. 31, 2012

(54) PARTICULATE FILTERS AND METHODS FOR REGENERATING PARTICULATE FILTERS

(75) Inventors: Douglas Munroe Beall, Painted Post, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 693 days.

(21) Appl. No.: 12/356,965

(22) Filed: Jan. 21, 2009

(65) Prior Publication Data

US 2010/0180772 A1 Jul. 22, 2010

(51) Int. Cl.
*B01D 39/06* (2006.01)

(52) U.S. Cl. ...... 55/523; 55/385.1; 55/522; 55/DIG. 30; 95/273; 422/180; 60/311

(58) Field of Classification Search ............ 55/523, 55/385.1, 522, DIG. 30; 95/273; 422/180; 60/311
See application file for complete search history.

(56) References Cited

U.S. PATENT DOCUMENTS

| | | | |
|---|---|---|---|
| 4,390,355 A | 6/1983 | Hammond, Jr. et al. | |
| 4,416,675 A | 11/1983 | Montierth | 55/502 |
| 4,875,335 A * | 10/1989 | Arai et al. | 60/274 |
| 5,212,131 A | 5/1993 | Belding | |
| 6,206,944 B1 | 3/2001 | Hickman | 55/523 |
| 6,843,822 B2 * | 1/2005 | Beall et al. | 55/523 |
| 6,864,198 B2 | 3/2005 | Merkel | |
| 7,141,089 B2 | 11/2006 | Beall et al. | |
| 7,179,316 B2 | 2/2007 | Merkel et al. | |
| 7,247,184 B2 | 7/2007 | Frost | |
| 7,309,371 B2 | 12/2007 | Merkel et al. | |
| 7,384,442 B2 * | 6/2008 | Bardhan et al. | 55/523 |
| 7,427,309 B2 * | 9/2008 | Ohno et al. | 55/523 |
| 7,485,170 B2 * | 2/2009 | Beall et al. | 55/523 |
| 7,520,911 B2 * | 4/2009 | Beall et al. | 55/523 |
| 7,601,194 B2 * | 10/2009 | Beall et al. | 55/523 |
| 7,704,296 B2 * | 4/2010 | Merkel | 55/523 |
| 7,713,897 B2 * | 5/2010 | Ogunwumi et al. | 501/134 |
| 7,744,675 B2 * | 6/2010 | Saukaitis et al. | 95/55 |
| 7,927,682 B2 * | 4/2011 | Beall et al. | 428/116 |
| 7,960,009 B2 * | 6/2011 | Backhaus-Ricoult et al. | 428/116 |
| 2004/0261384 A1 * | 12/2004 | Merkel et al. | 55/523 |
| 2006/0021308 A1 | 2/2006 | Merkel | 55/523 |
| 2006/0254231 A1 | 11/2006 | Hayashi et al. | 55/523 |
| 2007/0107397 A1 | 5/2007 | Merkel et al. | 55/523 |
| 2007/0119134 A1 | 5/2007 | Beall et al. | |
| 2007/0119135 A1 * | 5/2007 | Miao et al. | 55/523 |
| 2007/0140928 A1 | 6/2007 | Beall et al. | |
| 2008/0004171 A1 | 1/2008 | Melscoet-Chauvel et al. | 501/119 |
| 2008/0047243 A1 | 2/2008 | Beall et al. | |
| 2008/0110143 A1 * | 5/2008 | Chen et al. | 55/385.1 |
| 2008/0202107 A1 * | 8/2008 | Boorse et al. | 60/301 |
| 2008/0307760 A1 * | 12/2008 | Chatlani et al. | 55/523 |
| 2009/0049815 A1 * | 2/2009 | Beall et al. | 55/523 |

* cited by examiner

*Primary Examiner* — Jason M Greene
*Assistant Examiner* — Dung H Bui
(74) *Attorney, Agent, or Firm* — Matthew B. McNutt (57) ABSTRACT

A particulate filter may comprise an inlet end, an outlet end, and a plurality of channels disposed and configured to flow fluid from the inlet end to the outlet end, wherein the channels are defined by porous walls configured to trap particulate matter. The porous walls may have a cell density less than about 200 cpsi, a wall thickness of less than about 14 mils, a median pore size that ranges from about 13 micrometers to about 20 micrometers, a total porosity greater than about 45%, and a pore size distribution such that pores less than 10 micrometers contribute less than about 10% porosity.

23 Claims, 10 Drawing Sheets

Particulate Loading (g/L)

FIG. 3B $SL_t$ Shallow    $SL_t$ Steep    $SL_c$

Soot Loading (g/L)

FIG. 11A 275/12
Ø5.66"x6"; Q = 15.59cfm
Pore size = 17μm

Porosity (%)

FIG. 11B

Porosity (%)

FIG. 12  2"x6"
Q=26.25 cfm
MPS=20 μm
6 %<10 μm, 10.25 %>40 μm

FIG. 13  2"x6"
Q=26.25 cfm
52% porosity
MPS = 19 μm

PARTICULATE FILTERS AND METHODS FOR REGENERATING PARTICULATE FILTERS

TECHNICAL FIELD

The present teachings generally relate to particulate filters and methods of regenerating particulate filters. More specifically, the present teachings relate to particulate filters, such as, for example, wall-flow particulate filters, for trapping and combusting particulates contained in engine exhaust gas.

BACKGROUND

Environmental concerns have motivated the implementation of emission requirements for internal combustion engines throughout much of the world. Catalytic converters have been used to eliminate many of the pollutants present in exhaust gas; however, a filter is often required to remove particulate matter, such as, for example, ash and soot. Wall-flow particulate filters, for example, are often used in engine systems to remove particulates from the exhaust gas. Such particulate filters may be made of a honeycomb-like substrate with parallel flow channels or cells separated by internal porous walls. Inlet and outlet ends of the flow channels may be selectively plugged, such as, for example, in a checkerboard pattern, so that exhaust gas, once inside the substrate, is forced to pass through the internal porous walls, whereby the porous walls retain a portion of the particulates in the exhaust gas. Particulate capture by the porous walls can occur in two different stages: at first, inside the porous wall (deep-bed filtration), and later, on the porous wall in the flow channels (cake-bed filtration).

In this manner, wall-flow particulate filters have been found to be effective in removing particulates, such as, for example, ash and soot, from exhaust gas. However, the pressure drop across the wall-flow particulate filter increases as the amount of particulates trapped in the porous walls and channels increases. For a filter that is not conditioned (e.g., that does not have enough of an ash layer to stop particulate matter from penetrating the porous filter walls), there is generally a rapid increase in pressure drop during the initial deep-bed filtration stage (typically less than 1 g/L (gram per liter)), followed by a gradual increase in pressure drop with particulate loading during the cake-bed filtration stage. The increasing pressure drop results in a gradual rise in back pressure against the engine, and a corresponding decrease in the performance of the engine. Accordingly, soot is commonly oxidized and removed in a controlled regeneration process before excessive levels have accumulated.

One conventional regeneration technique, for example, involves heating the inlet exhaust gas to a temperature which supports burning of the soot off of the filter. This process, however, also releases energy in the form of heat, which raises the temperature of the filter. If the soot level in the filter becomes too high, regeneration can raise the filter's temperature to the point of failure, which may result in thermally induced cracking or melting of the filter. Filter failure can result in a severe reduction in the filter's filtration efficiency, requiring replacement. Accordingly, in order to avoid high filter temperatures that can lead to filter failure, it is advantageous to carry out regeneration at a sufficiently low soot level.

However, it also may be desirable to avoid triggering regeneration at too low a soot level, since to do so may result in an unduly large number of regeneration events. Repeated regeneration events can have negative impacts, such as, for example, by causing oil dilution, $NO_x$ penalty, fuel penalty, and/or engine power loss. It may therefore be desirable to permit a relatively large interval between regeneration events, while ensuring that regeneration is triggered prior to the soot level reaching a critical soot level to avoid regeneration at high filter temperatures.

The pressure drop, for example, across a wall-flow particulate filter can be used as a way to monitor the level of soot in the filter and trigger regeneration when the soot mass reaches a critical limit. In practice, however, there is some uncertainty as to the actual soot level in the filter due to such factors as measurement error, variations in pressure drop response from one filter to another, and/or the change in pressure drop response as a function of the presence of ash in the filter (e.g., whether a filter is new or has accumulated ash (ash conditioned)). In the case of a filter demonstrating a relatively low pressure drop response with respect to soot loading during the cake-bed filtration stage (e.g., the slope of the curve of pressure drop versus soot load level is shallow), this uncertainty can be rather large. Nevertheless, due to the objective of increasing fuel efficiency, some conventional approaches have concentrated on minimizing pressure drops across the filter regardless of particulate loading, thereby resulting in a low pressure drop response to soot loading not only during the initial deep-bed filtration stage, but also during the cake-bed filtration stage.

Maintaining a low pressure drop response, however, can also have a negative impact on fuel economy. More specifically, a low response of pressure drop to an increase in soot loading during the cake-bed filtration stage, especially in those cases where pressure drop is used to trigger a regeneration event, can negatively affect fuel efficiency. Regeneration requires energy input to the system to raise the temperature of the inlet gas to a sufficiently high level to initiate burning of the soot. This energy input typically comes from a post-injection of fuel, but whatever the energy input device, the result is a loss in fuel economy.

It may be desirable therefore to provide a filter that exhibits a relatively high pressure drop response to particulate matter loading (i.e., relatively steep slope for the curve of pressure drop versus soot load level) during the cake-bed filtration stage, while exhibiting a low pressure drop prior to particulate matter loading (e.g., when the filter is clean), and a relatively low pressure drop response to particulate matter loading (i.e., relatively shallow slope for the curve of pressure drop versus soot load level) during the deep-bed filtration stage. It also may be desirable to provide a filter that achieves a relatively high filtration efficiency (FE). Accordingly, it may be desirable to provide filters having geometric properties and microstructural properties that achieve the aforementioned desirable features.

It also may be desirable to provide a filter regeneration technique that does not result in triggering regeneration too early (resulting in too frequent regeneration), while ensuring that regeneration is performed prior to the filter reaching a critical particulate matter load level. In other words, it may be desirable to provide a filter and a regeneration technique that triggers regeneration at particulate matter load levels that are closer to critical load levels than those used by conventional techniques to trigger regeneration.

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments, the present teachings provide a particulate filter, comprising an inlet end, an outlet end, and a plurality of channels disposed and configured to flow fluid from the inlet end to the outlet end, wherein the channels are defined by porous walls configured to trap particulate matter, the porous walls having a cell density less than about 200 cpsi, a wall thickness of less than about 14 mils, a median pore size that ranges from about 13 micrometers to about 20 micrometers, a total porosity greater than about 45%, and a pore size distribution such that pores less than 10 micrometers contribute less than about 10% porosity.

In accordance with various additional exemplary embodiments, the present teachings provide a particulate filter, comprising an inlet end, an outlet end, and a plurality of channels disposed and configured to flow fluid from the inlet end to the outlet end, wherein the channels are defined by porous walls configured to trap particulate matter, and wherein the particulate filter is configured such that fluid flowing through the particulate filter at a temperature of 500° C. and fluid flow rate of 1400 m$^3$/hr exhibits a low clean pressure drop from the inlet end to the outlet end that is less than or equal to 1.7 kPa, a low pressure drop response to particulate loading of the particulate filter during a deep-bed filtration stage defined by a slope less than or equal to about 3.4 kPa/(g/L of soot density), and a steep pressure drop response to particulate loading of the particulate filter during a cake-bed filtration stage defined by a slope greater than about 0.9 kPa/(g/L of soot density).

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The invention can be understood from the following detailed description either alone or together with the accompanying drawings. The drawings are included to provide a further understanding of the invention, and are incorporated in and constitute a part of this specification. The drawings illustrate one or more exemplary embodiments and together with the description serve to explain various principles and operation.

DESCRIPTION OF EXEMPLARY EMBODIMENTS

As discussed above, when using a pressure drop response to soot loading for monitoring soot load level of a filter and triggering regeneration when the soot load reaches a critical limit, some uncertainty exists as to actual soot load level in the filter due to such factors as measurement error, variations in pressure drop response from one filter to another, and the change in pressure drop response as a function of the presence of ash in the filter. Due to that uncertainty, therefore, regeneration is often triggered at a pressure drop that corresponds to a soot load level less than the critical soot load level. In some conventional filter configurations, when the pressure drop response of the filter is relatively low with respect to soot loading during the cake-bed filtration stage, the uncertainty results in the need to trigger regeneration earlier as compared to a filter having a relatively high pressure drop response to soot loading during the cake-bed filtration stage.

The present teachings contemplate particulate filters configured to remove particulate matter from a fluid stream, and methods for regenerating such particulate filters. More specifically, the particulate filters may be configured to trap particulate matter, such as, for example, soot and ash contained in engine exhaust gas. The present teachings contemplate particulate filters that produce a low pressure drop when the filter is clean, followed by a high pressure drop as the filter becomes dirty, that is, loaded with particulate matter, including, for example, soot. In other words, various exemplary embodiments of the present teachings consider particulate filter configurations that initially have a low pressure drop before ash and soot build up (e.g., when clean), have a relatively low pressure drop response during the deep-bed filtration stage (e.g., a minimized slope during the initial period of ash and soot capture in the filter's walls), but are sensitive to continued soot buildup, producing a relatively steep pressure drop response to an increase in the filter's soot load during the cake-bed filtration stage (e.g., a maximized slope throughout the remaining period of soot capture on the filter's walls). In an exemplary embodiment, the pressure drop response during deep-bed filtration approaches the pressure drop response during cake-bed filtration. In other words, the slope of the curve of pressure drop versus soot load is substantially the same during both deep-bed filtration and cake-bed filtration.

For example, a filter's microstructural properties, such as, for example, pore size, porosity and/or pore size distribution determined in accordance with various exemplary embodiments of the present teachings may be sufficient to provide a low clean pressure drop across the filter, as well as a low pressure drop response to soot loading of the filter during the deep-bed filtration stage. Additionally, a filter's geometric properties, such as, for example, cell density (i.e., cells per square inch (cpsi)), wall thickness, filter length and/or filter diameter determined in accordance with various further exemplary embodiments of the present teachings may be sufficient to provide a steep pressure drop response to soot loading of the filter during the cake-bed filtration stage.

The exemplary embodiments mentioned above and described herein represent particulate filters whose geometry and microstructure can produce a low clean pressure drop, a low pressure drop response to particulate loading of the particulate filter during the deep-bed filtration stage (if any), and a steep pressure drop response to particulate loading of the particulate filter during the cake-bed filtration stage, thereby promoting the engine's fuel economy, decreasing the filter's regeneration frequency, and increasing the filter's filtration efficiency.

As used herein, the term "particulate filter" or "filter" refers to a structure which is capable of removing particulate matter from a fluid stream passing through the structure. The present teachings may apply to the removal of any particulate matter from any fluid stream, and the fluid stream may be in the form of a gas or a liquid. The gas or liquid may also contain another phase, such as a solid particulate in either a gas or liquid stream, or droplets of liquid in a gas stream. Non-limiting, exemplary fluid streams include exhaust gases produced by internal combustion engines, such as, for example, diesel and gasoline engines, aqueous liquid streams, and coal combustion flue gases produced in a coal gasification process.

The particulate matter may be in any phase. Thus, the particulate matter may be present, for example, as a solid or liquid in a gas fluid stream, or as a solid in a liquid fluid stream. Exemplary particulate matter includes, for instance, diesel particulate matter (e.g. the particulate component of diesel exhaust from diesel cars and trucks), which includes diesel soot and aerosols such as ash particulates, metallic abrasion particles, sulfates, and/or silicates, for example. As used herein, the term "soot" refers to impure carbon particles that result from the incomplete combustion of hydrocarbons during the internal combustion process. The term "ash" refers to non-combustible metallic material that is found in almost all petroleum products. For diesel applications, ash is typically produced from crankcase oil and/or fuel borne catalysts. As used herein, the term "critical particulate load level" refers to the particulate load level at which the pressure drop penalty is too large for engine operation or regeneration can cause failure of the filter due to high temperatures and/or large thermal gradients when burning the particulate matter.

The particulate filters of the present teachings can have any shape or geometry suitable for a particular application, as well as a variety of configurations and designs, including, but not limited to, for example, a wall-flow monolith structure or a partial-flow monolith structure (i.e., any combination of a wall-flow monolith structure and a flow-through monolith structure). Exemplary wall-flow monoliths include, for example, any monolithic structure comprising channels or porous networks or other passages with individual passages open and plugged at opposite ends of the structure, thereby enhancing fluid flow through the channel walls of the monolith as the fluid flows from one end to the other. Exemplary partial-flow monoliths include, for example, any monolithic structure that is partially wall-flow, as described above, and partially flow-through wherein some of the channels or porous networks or other passages are open at both ends and permit the flow of a fluid stream through the monolith passages from one end to an opposite end. Various exemplary embodiments of the present teachings contemplate utilizing the cellular geometry of a honeycomb configuration due to its high surface area per unit volume for deposition of particulate matter. Those having ordinary skill in the art will understand that the cross-section of the cells of a honeycomb structure may have virtually any shape and are not limited to square or hexagonal. Similarly, and as may be further understood from the teachings below, a honeycomb structure may be configured as either a wall-flow structure or partial-flow structure.

Figure 1:
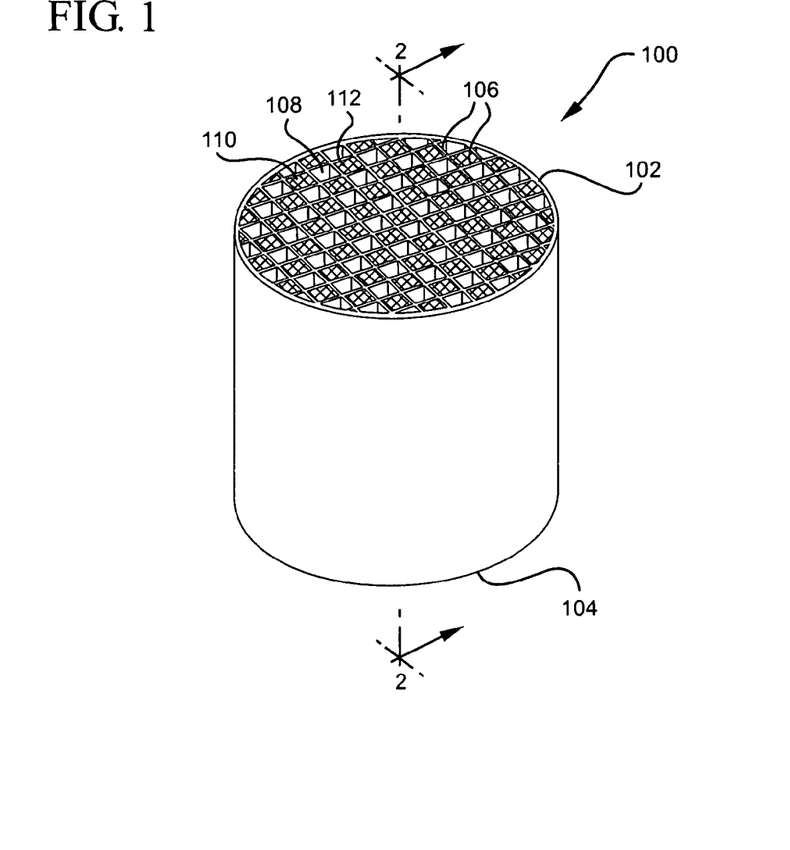
FIG. 1 is a perspective view of one exemplary embodiment of a particulate filter in accordance with the present teachings.

FIG. 1 illustrates one exemplary embodiment of a particulate filter suitable for practice of the present teachings. The particulate filter 100 has an inlet end 102 an outlet end 104, and a plurality of channels 108, 110 extending from the inlet end 102 to the outlet end 104. The channels 108, 110 are defined by intersecting porous walls 106, thereby forming a generally honeycomb configuration. Although the particulate filter 100 is depicted with channels having a substantially square cross-section (i.e., in a plane perpendicular to a longitudinal axis of the filter 100), those ordinarily skilled in the art would understand that channels 108, 110 can have various additional geometries, such as, for example, cross-sections that are circular, square, triangular, rectangular, hexagonal, sinusoidal, or any combination thereof, without departing from the scope of the present teachings.

Additionally, although the particulate filter 100 is depicted as cylindrical, those skilled in the art would understand that such shape is exemplary only and particulate filters in accordance with the present teachings may have a variety of shapes, including, but not limited to, oval-shaped, block-shaped, cube-shaped, triangular-shaped, etc.

The particulate filter 100 may be made of any suitable material, and the porous walls 106 are not limited to any particular porous material. Exemplary materials include a variety of porous ceramics, including, but not limited to, cordierite, silicon carbide, silicon nitride, aluminum titanate, eucryptite, calcium aluminate, zirconium phosphate, and spondumene. In various exemplary embodiments, the particulate filter 100 may be formed as a monolithic structure, for example, via extruding and/or molding. Those having ordinary skill in the art are familiar with the various techniques for forming such ceramic monolithic structures. Particulate filters may in various exemplary embodiments also include a skin forming an outer peripheral lateral surface of the filter. The skin may be made of the same or a different material than the porous walls, and in various embodiments may be thicker than the porous walls.

Figure 2:
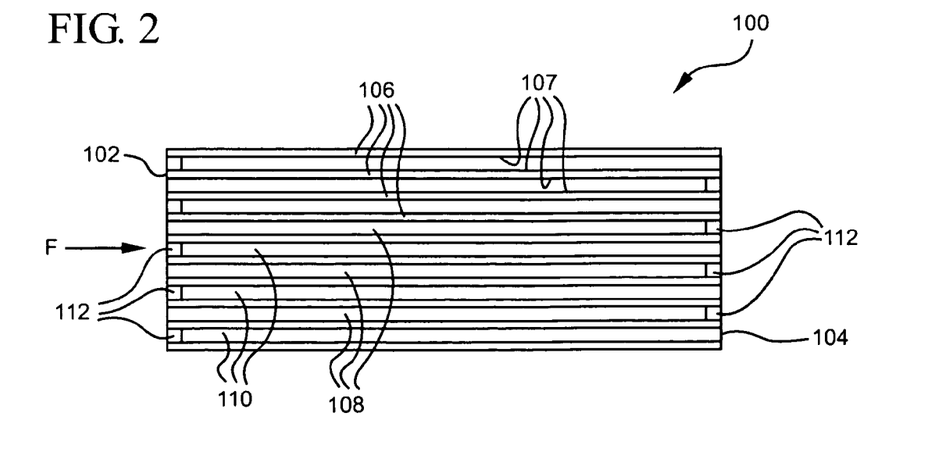
FIG. 2 is a schematic cross-sectional view of the particulate filter of FIG. 1.

As depicted in FIGS. 1 and 2, various exemplary embodiments of the present teachings further contemplate the particulate filter 100 with one or more selectively plugged channel ends to provide a wall-flow structure that allows for more intimate contact between the fluid stream and the porous walls 106. FIG. 2 is a schematic cross-sectional view of the particulate filter 100 of FIG. 1 taken through line 2-2, depicting channels 108, 110 in the particulate filter 100. Alternate channels 108 and 110 are blocked with plugs 112 at opposite ends. In the exemplary embodiment of FIGS. 1 and 2, for example, the channels 110 are blocked by plugs 112 at the inlet end 102 of the filter 100 and the channels 108 are blocked by plugs 112 at the outlet end 104 of the filter 100. This blocking of the channels 108, 110 forces convection of fluid through the porous walls 106. Fluid flowing in the direction arrow F enters the particulate filter 100 through channels 108 via the inlet end 102, but is blocked by plugs 112 in the channels at the outlet end 104. That blockage causes a pressure build-up within the blocked channels 108 which forces the fluid to pass through the porous walls 106 of the channels 108. As the fluid is forced through the porous walls 106, particulate matter is trapped in the walls 106 while the fluid passes through unobstructed. The filtered fluid then enters the adjacent channels 110 and exits the particulate filter 100 through channels 110 via the outlet end 104.

The plugs 112 may be made of any suitable material, and are not limited to any particular plugging paste or material. In various exemplary embodiments, for example, in particular for filters made from cordierite, the plugs 112 may be formed from a cordierite grog used with binders and fillers. Exemplary plugs, for example, may also include a plugging paste consisting of a mixture of aluminum titanate powder, calcium aluminate powder, Kaowool® aluminosilicates fibers, silica sol, methyl cellulose binder and water, cured by heating.

In accordance with various exemplary embodiments of the present teachings, the porous walls 106 can trap particulate matter in various different ways, such as, for example, inside the thickness of the porous walls 106 and on surfaces 107 of the porous walls 106. Trapping particulate matter inside the filter wall is commonly referred to as deep-bed filtration. Beyond a certain point, however, the deposition of particulate matter in the porous walls 106 can decrease the wall permeability sufficiently so that any subsequent particulate matter capture is on the surfaces 107 of the porous walls 106. This type of capture is often referred to as cake-bed filtration. During deep-bed filtration, there is a steep increase in back pressure with soot loading of the particulate filter. Accordingly, it is desirable to have low pressure drop response to particulate matter loading in the deep-bed filtration stage (e.g., minimize the slope of the pressure drop response curve). The filtration efficiency is also observed to increase from initial (clean filter) filtration efficiency to maximum filtration efficiency as the deposited particulate matter itself acts as a filtering medium. During cake-bed filtration, the filtration efficiency is maximized and the increase in back pressure with soot loading is more gradual (e.g., the pressure drop response to soot loading is generally less) as compared to deep-bed filtration.

Consequently, a particulate filter's pressure drop response to particulate matter loading will generally be greater during the deep-bed filtration stage as compared with the cake-bed filtration stage, thereby creating a knee 202 (shown schematically in FIG. 3A) in the filter's pressure drop response curve 200. In order to minimize the change of the slope of the pressure drop response curve 200 at knee 202, various exemplary embodiments of the present teachings contemplate reducing the slope of the pressure drop response curve during the initial stage of deep-bed filtration (i.e., providing a relatively shallow slope as compared to the typically higher slopes observed during deep-bed filtration) to approach the slope of the pressure drop response curve during the latter stage of cake-bed filtration (See FIG. 3A). In order to eliminate and/or minimize the initial knee 202 (e.g., provide a substantially continuous sloped curve 200), various additional exemplary embodiments further contemplate a particulate filter configured (e.g., based on its microstructure) such that deep-bed filtration is eliminated or minimized, and particulate loading of the filter results directly in cake-bed filtration. In such cases, the present teachings nonetheless contemplate filters configured to achieve a low clean pressure drop and a steep pressure drop response to particulate loading during cake-bed filtration.

Those having skill in the art will appreciate that the pattern of the plugged channel ends shown in FIGS. 1 and 2 and described above is exemplary only and that other arrangements of plugged channels may be utilized without departing from the scope of the present teachings. Moreover, those having skill in the art will appreciate that partial-flow filter structures (i.e., where some channels of the filter are plugged and some channels of the filter are open at both ends) also may be utilized without departing from the scope of the present teachings. The description above regarding deep-bed filtration and cake-bed filtration, and the pressure drop responses associated with such filtration periods, applies equally to partial-flow filter structures as it does to wall-flow filter structures, as at least some fluid flowing through the channels in a partial-flow structure passes through the porous filter walls resulting in trapping of particulate matter within those walls.

As discussed above, the geometric and porous wall structural properties of a particulate filter, such as, for example a particulate filter like the particulate filter 100 of FIGS. 1 and 2, influence an engine's fuel economy, the particulate filter's filtration efficiency, and the particulate filter's regeneration frequency. As will be described in more detail below, the inventors have discovered that a particulate filter that achieves a low clean pressure drop and a steep pressure drop response to particulate loading (e.g., during cake-bed filtration) may promote the fuel economy and filtration efficiency, while decreasing the filter's regeneration frequency. Moreover, the inventors have discovered a combination of particulate filter geometric and porous wall structure properties that can achieve a high initial filtration efficiency, a low clean pressure drop, a low pressure drop response to particulate loading during the deep-bed filtration stage (if any), and a steep pressure drop response to particulate loading during the cake-bed filtration stage.

As used herein, the term "clean pressure drop" refers to the resulting pressure drop of a fluid as it flows through the particulate filter, from the inlet end to the outlet end, when the particulate filter is clean. Accordingly, a particulate filter with "a low clean pressure drop" refers to a filter that initially allows a fluid to pass relatively freely, resulting in a low pressure drop of the fluid as it crosses the filter. As used herein, the term "pressure drop response to particulate loading" refers to the resulting change in pressure drop of the fluid as it flows through the particulate filter from the inlet end to the outlet end, as the filter becomes dirty and loaded with particulate matter. As used herein, the term "a low pressure drop response to particulate loading of the particulate filter during a deep-bed filtration stage" refers to a filter that exhibits a diminished sensitivity to particulate loading (as compared with conventional filters) during the initial stage of deep-bed filtration, resulting in a relatively low increase in pressure drop (as compared with conventional filters) of the fluid passing therethrough as the particulate filter is loaded with particulate matter. As used herein, the term "a steep pressure drop response to particulate loading of the particulate filter during a cake-bed filtration stage" refers to a filter that exhibits heightened sensitivity to particulate loading (as compared with conventional filters) during the latter stage of cake-bed filtration, resulting in a relatively large increase in pressure drop (as compared with conventional filters) of the fluid passing therethrough as the particulate filter is loaded with particulate matter.

Figure 3A:
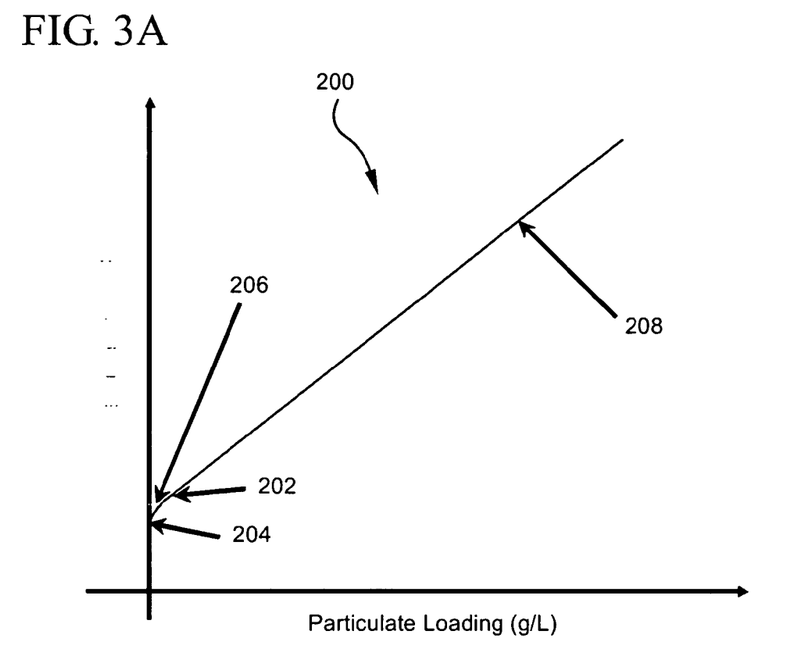
FIG. 3A is a schematic of a graph of the pressure drop versus particulate loading of a particulate filter in accordance with various exemplary embodiments of the present teachings.

FIG. 3A is a graph schematically illustrating the pressure drop response to particulate loading of a particulate filter in accordance with the present teachings. As shown in FIG. 3A, filters in accordance with various exemplary embodiments of the present teachings may exhibit a low clean pressure drop (e.g., when the filter is clean) as indicated at 204, a relatively low (or shallow) pressure drop response to particulate loading during the deep-bed filtration stage (e.g., during the initial brief period of particulate loading represented up to the knee 202 in the curve 200 of FIG. 3A) as indicated at 206, and a relatively steep pressure drop response to particulate loading during the cake-bed filtration stage (e.g., throughout the duration of particulate loading represented by the linear portion of the curve of FIG. 3A) as indicated at 208.

As depicted by FIG. 3A, those having ordinary skill in the art will appreciate that although the slope of the curve at 206 representing the deep-bed filtration stage is greater than the slope of the curve at 208 representing the cake-bed filtration stage, as compared to conventional filter structures, the exemplary embodiments herein represent a relatively shallow slope of the pressure drop response curve during deep-bed filtration and a relatively steep slope during cake-bed filtration.

Figure 3B:
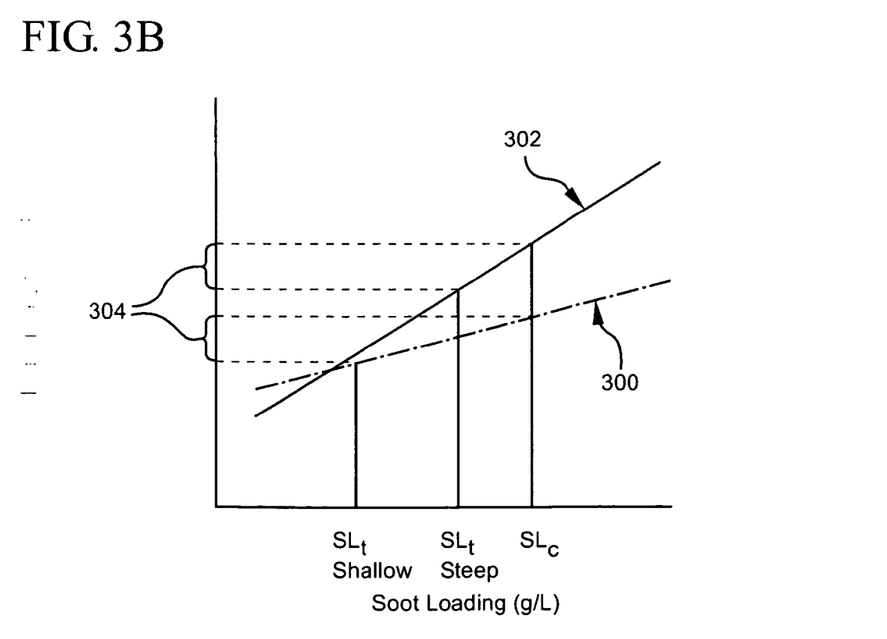
FIG. 3B is a schematic of a graph comparing a relatively steep pressure drop response to soot loading of a particulate filter during cake-bed filtration and a relatively low pressure drop response to soot loading of a particulate filter during cake-bed filtration.

With reference to FIG. 3B, curve 300 schematically illustrates the pressure drop response to soot loading of a particulate filter having a relatively shallow pressure drop response during cake-bed filtration (e.g., exemplary of conventional filters) and curve 302 schematically illustrates a particulate filter having a relatively steep pressure drop response during cake-bed filtration. The curve 300 corresponding to the shallow pressure drop response, if extrapolated to a soot load level of zero, has a relatively low clean pressure drop and a relatively low soot-loaded pressure drop during cake-bed filtration, resulting in an overall shallow response slope to soot loading. The curve 302 corresponding to the steep pressure drop response, if extrapolated to a soot load level of zero, has a relatively low clean pressure drop and a steep response slope to soot loading during cake-bed filtration. The critical soot load level, or the soot load that is not to be exceeded in order to avoid raising the filter's temperature to an unacceptable level during regeneration, is shown in FIG. 3B as $SL_c$.

As discussed above, there is some uncertainty in the estimated soot load obtained from monitoring pressure drop across the particulate filter as compared to the actual soot load. As discussed above, various factors, such as, for example, the variability in pressure drop response of a given filter, the level of ash present in the filter, and/or the accuracy of the sensors used for the calculation, etc. contribute to this uncertainty. The range of uncertainty in pressure drop is accordingly represented by the range shown by brackets 304 on the pressure drop axis in FIG. 3B.

In order to not exceed $SL_c$, an after-treatment system generally uses the lower end of the range of uncertainty in pressure drop to trigger regeneration. In FIG. 3B, this lower end of the range of uncertainty corresponds to a soot load target ($SL_t$) where a system may trigger a regeneration event with a sufficient level of confidence that the $SL_c$ has not been exceeded by considering the uncertainty involved. As depicted by FIG. 3B, the $SL_t$ for the steep pressure drop response curve ($SL_{t,steep}$) far exceeds the $SL_t$ for the shallow pressure drop response curve ($SL_{t,Shallow}$). Accordingly, regeneration of a particulate filter that demonstrates a steep pressure drop response during cake-bed filtration (represented by curve 302) could be performed with longer intervals between regeneration events as compared to a particulate filter that demonstrates a shallow pressure drop response to soot loading during cake-bed filtration (represented by curve 300), with both filters possessing the same $SL_c$.

As discussed above, the present teachings contemplate configuring a particulate filter with various geometric properties and porous wall microstructural properties in order to achieve the desired steep pressure drop response to particulate (e.g., soot) loading of the filter during the cake-bed filtration stage, while maintaining a low pressure drop and high filtration efficiency when the filter is clean. In some exemplary embodiments, the present teachings further contemplate a particulate filter configuration in which little or no deep-bed filtration occurs and particulate loading results substantially directly in cake-bed filtration. In other exemplary embodiments, however, the present teachings further contemplate configuring a particulate filter in which deep-bed filtration occurs to achieve a low pressure drop response to particulate loading during the deep-bed filtration stage.

To determine a range of filter design variables, such as, for example, geometric properties and porous wall microstructural properties, to achieve a desired high filter FE, low clean pressure drop, low pressure drop response to particulate (e.g., soot) loading during deep-bed filtration (if any), and steep pressure drop response to particulate (e.g., soot) loading during cake-bed filtration, the inventors used modeling data, as well as experimental results, shown and described below with reference to FIGS. 4-13.

Figure 4:
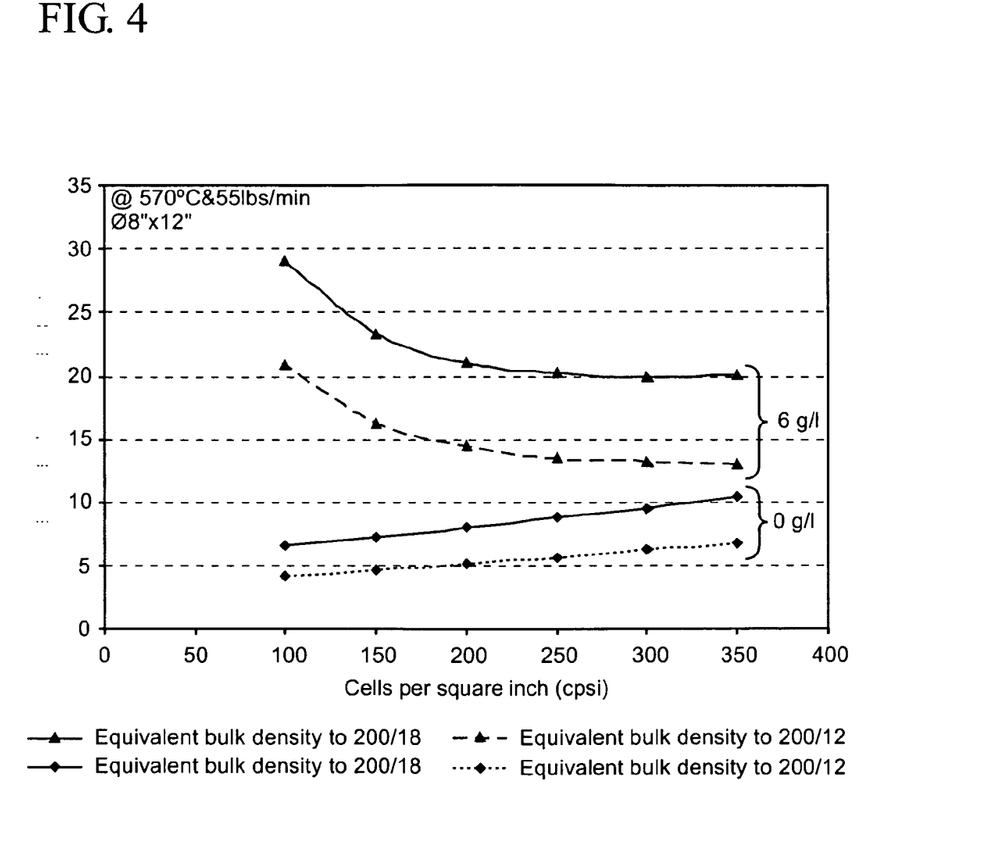
FIG. 4 shows results obtained from modeling data of pressure drop as a function of wall cell density for a clean filter and a soot-loaded filter.

FIG. 4 shows results obtained from modeling data of clean and soot-loaded pressure drop, measured in inches of mercury (inches of Hg), as a function of filter porous wall cell density, measured in cells per square inch (cpsi). In FIG. 4, a particulate filter with a diameter of 8 inches and a length of 12 inches was modeled at a gas flow rate of 55 lbs/min at 570° C. As shown by FIG. 4, clean pressure drop (represented by 0 grams per liter (g/l)), increases with an increase in wall cell density (cpsi), while-soot loaded pressure drop (represented by 6 g/l) increases with a decrease in wall cell density. Furthermore, the difference between the clean and soot-loaded pressure drops increases as wall cell density decreases. FIG. 4 illustrates that this effect is particularly strong for wall cell densities less than about 200 cpsi, where the soot-loaded pressure drop increases significantly as a function of decreasing wall cell density. Consequently, in order to provide for low clean pressure drop and steep pressure drop response to soot loading, the present teachings contemplate particulate filters with low wall cell densities, such as, for example, wall cell densities of less than about 200 cpsi, for example, wall cell densities less than about 150 cpsi. In FIG. 4, with the change in wall cell density, the wall thickness was changed such that the equivalent bulk density of different comparative filters was constant (e.g, at 200/18 and 200/12 cpsi/mils). As those skilled in the art would understand, when comparing filters, it is sometimes important to keep the bulk density constant, as bulk density can determine the maximum filter temperature increase during regeneration for a given particulate loading level.

Figure 5:
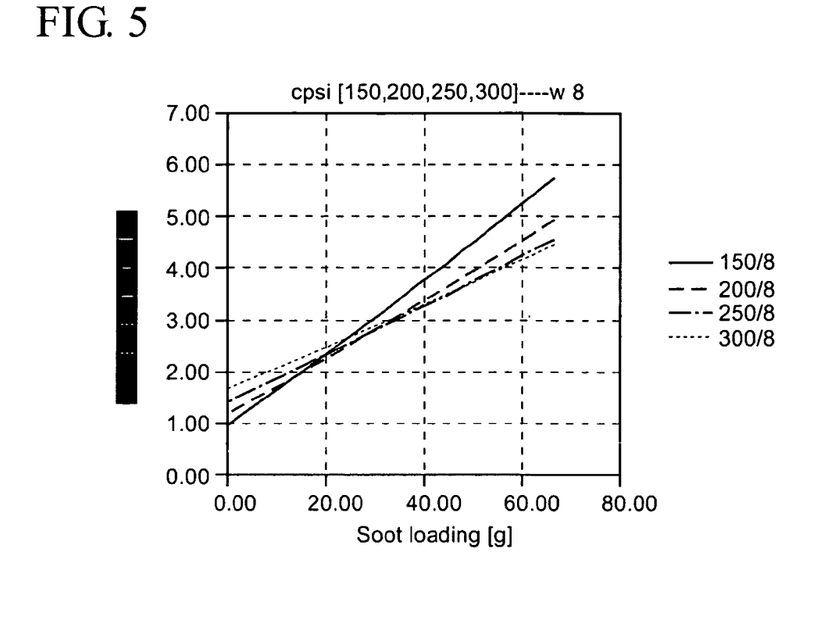
FIG. 5 shows results obtained from modeling data of pressure drop as a function of soot loading, corresponding to filters having various wall cell densities.

A similar effect is also shown in FIG. 5, which shows results obtained from modeling data of pressure drop as a function of soot loading, corresponding to various wall cell densities of 150 cpsi, 200 cpsi, 250 cpsi, and 300 cpsi, respectively. In FIG. 5, a particulate filter with a diameter of 12 inches, a length of 8 inches, a wall thickness of 8 mils (1 mil=1/1000 of an inch), a 50% porosity and a 19 μm median pore diameter was modeled at a gas flow rate of 1400 m³/hr at 500° C. As illustrated by FIG. 5, the increase in pressure drop as a function of soot load is higher for the lower wall cell densities, 200 cpsi and 150 cpsi.

Figure 6:
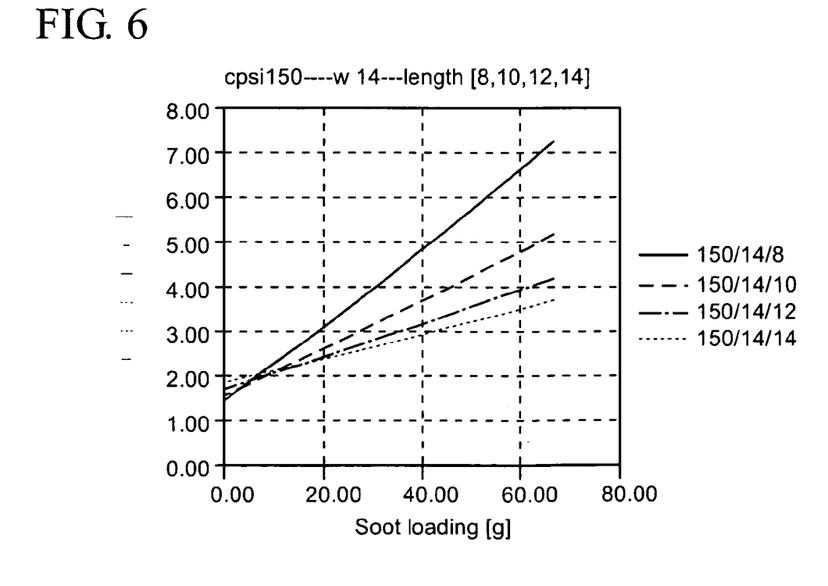
FIG. 6 shows results obtained from modeling data of pressure drop as a function of soot loading corresponding to filters of various lengths.

FIG. 6 shows results obtained from modeling data of pressure drop as a function of soot loading, measured in grams (g), corresponding to various filter lengths of 8 inches, 10 inches, 12 inches, and 14 inches, respectively (shown by curves of 150/14/8; 150/14/10; 150/14/12; and 150/14/14, where the last number in the series corresponds to the length of the filter). In FIG. 6, the particulate filters with a diameter of 12 inches, a wall thickness of 14 mils, a wall porosity of 50%, a 19 μm median pore diameter, and a 150 cpsi were modeled at a gas flow rate of 1400 m³/hr at 500° C. As shown in FIG. 6, the slope of pressure drop versus soot load is larger for filters with lower length/diameter ratios (e.g., filters with shorter filters lengths). For example, the filter with an 8/12 (0.66) length/diameter ratio, which corresponds to a space velocity of approximately 70 sec$^{-1}$, has a slope approximately three times the slope of the filter with a 14/12 (1.17) length/diameter ratio, which corresponds to a space velocity of approximately 40 sec$^{-1}$. Consequently, in order to provide for steep pressure drop response to soot loading, the present teachings contemplate particulate filters with lower length/diameter ratios, such as for example, a length/diameter less than about 1, for example, a length/diameter less than about 0.85, or, for example, a length/diameter less than about 0.7, which correspond to larger space velocities, such as, for example, space velocities greater than about 40 sec$^{-1}$, or, for example, space velocities greater than about 70 sec$^{-1}$.

Figure 7A:
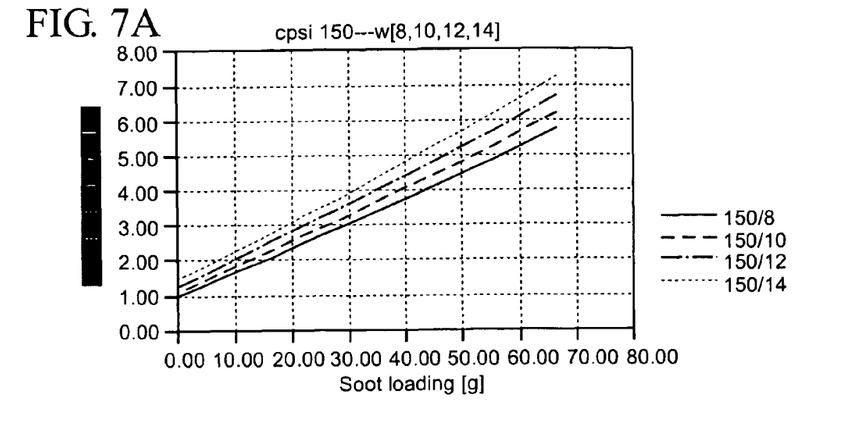
FIGS. 7A, 7B and 7C show results obtained from modeling data of pressure drop as a function of soot loading corresponding to filters having various wall thicknesses.
Figure 7B:
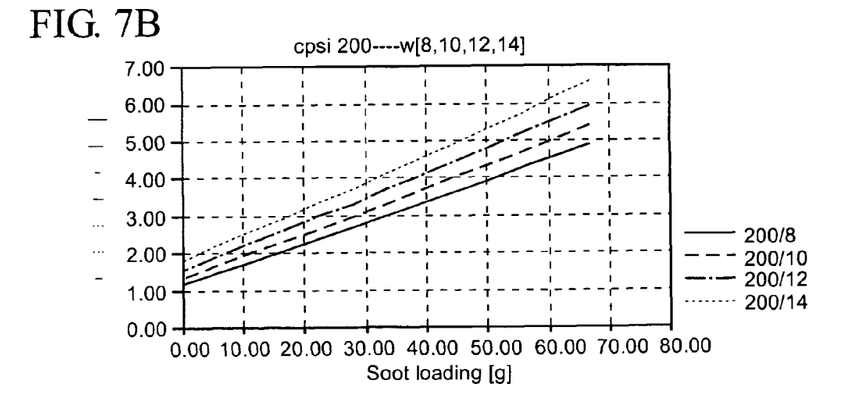
Figure 7C:
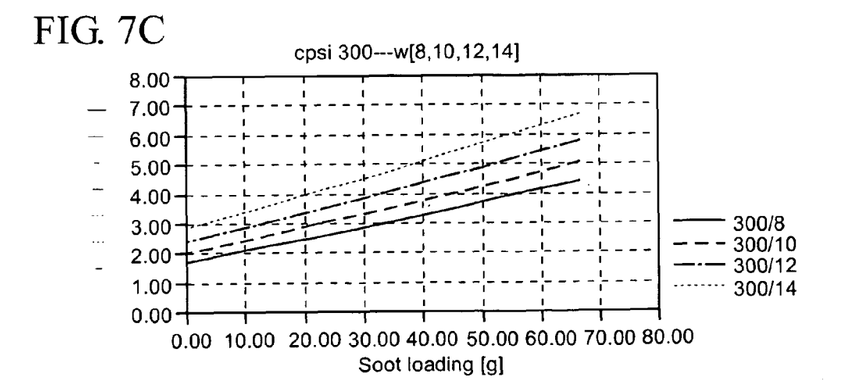

FIGS. 7A, 7B and 7C demonstrate the sensitivity of pressure drop response to soot loading for various channel wall thicknesses of 8 mils, 10 mils, 12 mils and 14 mils, respectively, at various wall cell densities, 150 cpsi (FIG. 7A), 200 cpsi (FIG. 7B), and 300 cpsi (FIG. 7C), respectively. In FIGS. 7A, 7B and 7C, particulate filters with a diameter of 12 inches, a length of 8 inches, a wall porosity of 50%, and a 19 μm median pore diameter were modeled at a gas flow rate of 1400 m³/hr at 500° C. As shown in each figure, an increase in wall thickness, depicted by each curve in the respective figures, increases a particulate filter's clean pressure drop, as well as the particulate filter's soot-loaded pressure drop, which thereby, results in a higher slope for the pressure drop increase with soot load. As illustrated in FIGS. 7A, 7B and 7C, however, this increase in slope with respect to increase in wall thickness is modest. Consequently, no matter what the wall cell density (cpsi), the advantages of maintaining a low clean pressure drop with smaller wall thickness can outweigh the benefits of having a slightly higher slope of pressure drop increase with soot loading. Therefore, in order to maintain a low clean pressure drop, the present teachings contemplate particulate filters with channel wall thicknesses, for example, less than about 14 mils.

Although a particulate filter's porous wall microstructure does not appear to have a significant impact on a fluid's pressure drop at high soot loading levels (e.g., during cake-bed filtration), parameters such as wall porosity, pore size and pore size distribution are known to have an effect on the filter's clean pressure drop, as well as the filter's filtration efficiency and the increase in initial pressure drop that results from deep-bed filtration. Microstructural properties such as these can thus also be used for a particulate filter demonstrating a steep pressure drop response to soot loading during cake-bed filtration. As discussed above, the present teachings contemplate using various microstructural properties of a particulate filter in order to achieve the desired low clean pressure drop, high filtration efficiency, and reduced increase in initial pressure drop. As before, to determine these microstructural properties, modeling and experimental data was used to obtain a range of structural design variables for a particulate filter with these desirable characteristics.

Figure 8A:
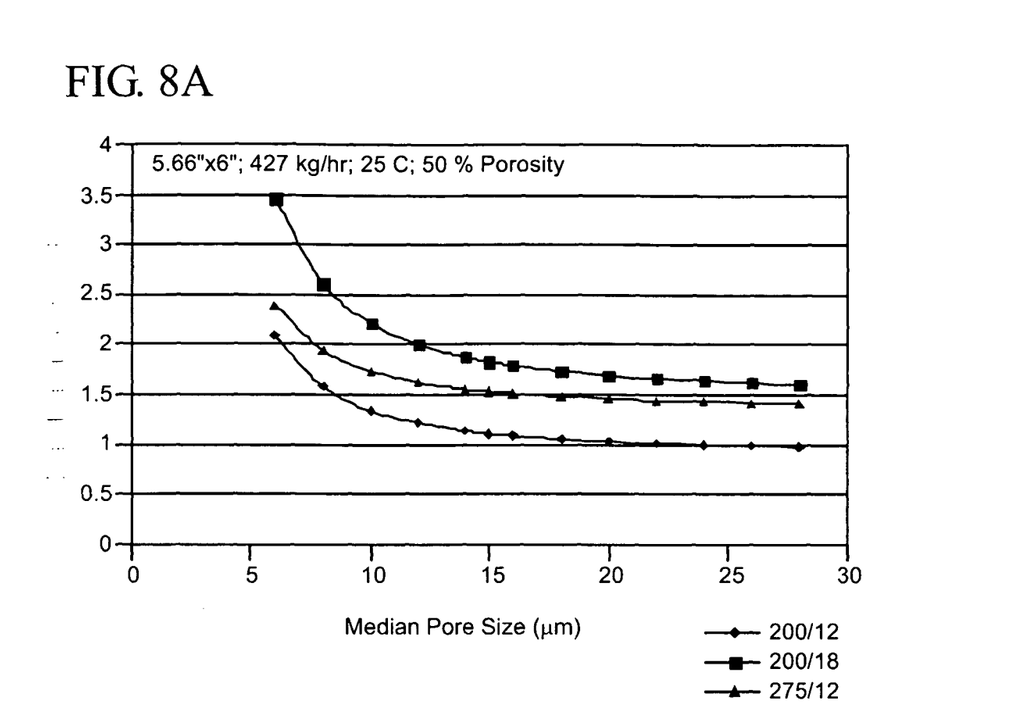
FIG. 8A shows results obtained from modeling data of clean pressure drop as a function of wall median pore size corresponding to filters of various geometries.
Figure 8B:
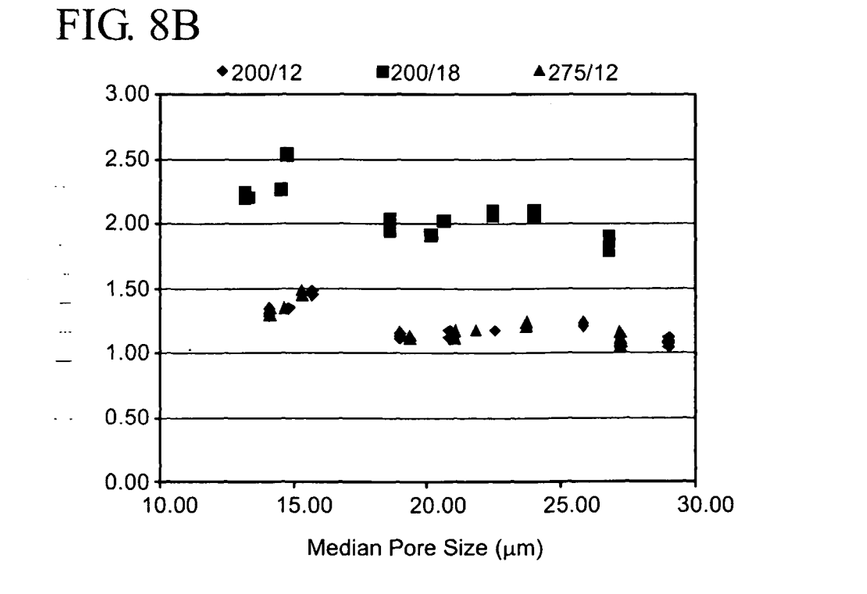
FIG. 8B shows results obtained from experimental tests of clean pressure drop as a function of wall median pore size corresponding to filters of various geometries.
Figure 9A:
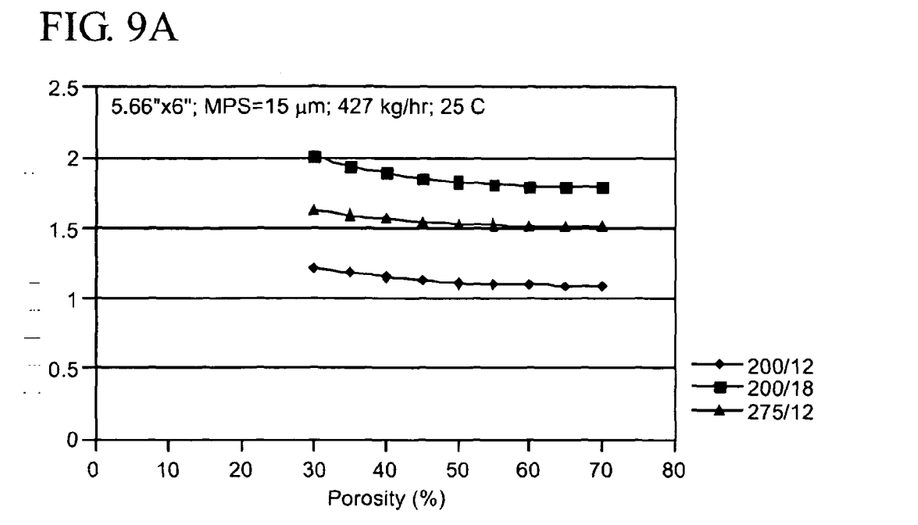
FIG. 9A shows results obtained from modeling data of clean pressure drop as a function of wall porosity corresponding to filters of various geometries.

The sensitivity of clean pressure drop to wall median pore size and wall porosity is shown in FIGS. 8A and 8B, and 9A and 9B respectively, for various combinations of wall cell density/wall thickness, i.e., 200 cpsi/12 mils, 200 cpsi/18 mils and 275 cpsi/12 mils. In FIGS. 8A and 9A, a 5.66 inch diameter by 6 inch length particulate filter was modeled at a gas flow rate of 427 kg/hr at 25° C. As shown by FIG. 8A, the clean pressure drop for a particulate filter with a porosity of about 50% increases appreciably for wall median pore sizes less than about 13 μm, with wall median pore sizes greater than about 13 μm resulting in only a modest decrease in clean pressure drop. As shown by FIG. 9A, the clean pressure drop for a particulate filter with a wall median pore size (MPS) of about 15 μm decreases modestly with an increase in wall porosity. Clean pressure drop is, therefore, shown to be relatively insensitive to an increase in wall porosity, but relatively sensitive to a decrease in wall median pore size, for example, lower than about 13 μm.

Figure 9B:
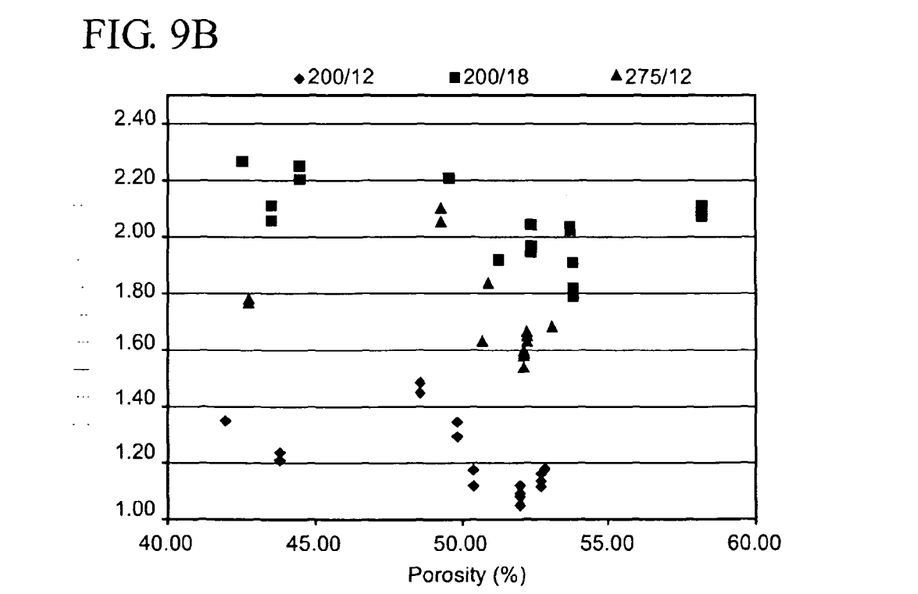
FIG. 9B shows results obtained from experimental tests of clean pressure drop as a function of wall porosity corresponding to filters of various geometries.

Similarly, FIGS. 8B and 9B show the results of experimental tests made on filters with various combinations of wall cell density/wall thickness (i.e., 200 cpsi/12 mils corresponding to the diamonds on the plot, 200 cpsi/18 mils corresponding to squares on the plot, and 275 cpsi/12 mils corresponding to triangles on the plot). As above, each filter had a 5.66 inch diameter by 6 inch length, and was tested at a gas flow rate of 427 kg/hr at 25° C. Providing confirmation of the above modeled data, FIG. 8B further illustrates that clean pressure drop was relatively insensitive to an increase in wall porosity, while FIG. 9B further illustrates that clean pressure drop was relatively sensitive to a decrease in wall median pore size.

Figure 10A:
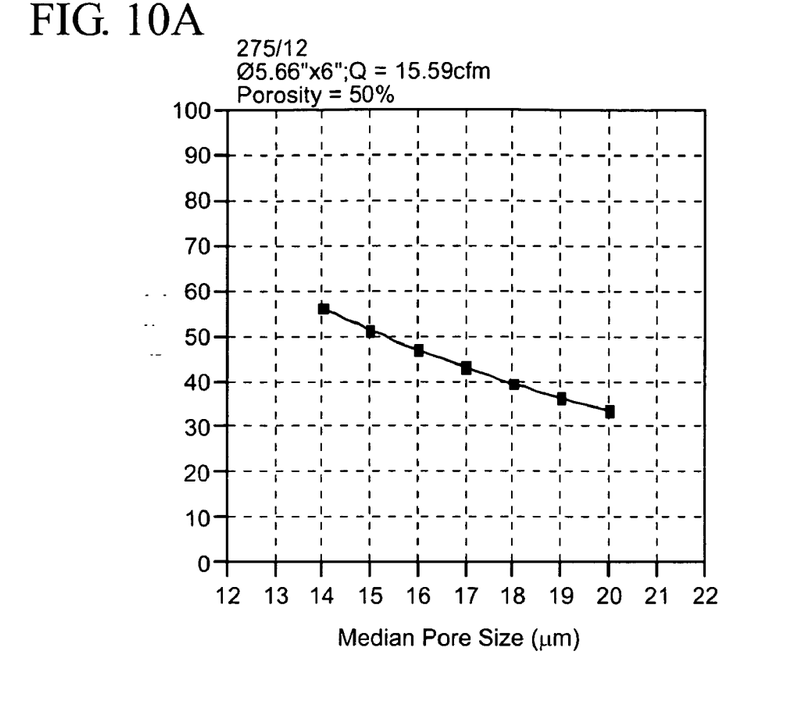
FIG. 10A shows results obtained from modeling data of clean filter efficiency as a function of wall median pore size.
Figure 10B:
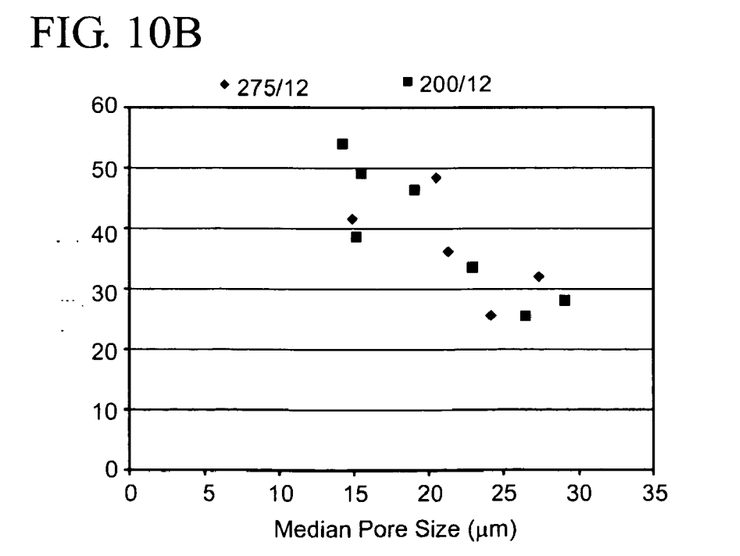
FIG. 10B shows results obtained from experimental tests of clean filter efficiency as a function of wall median pore size.
Figure 11A:
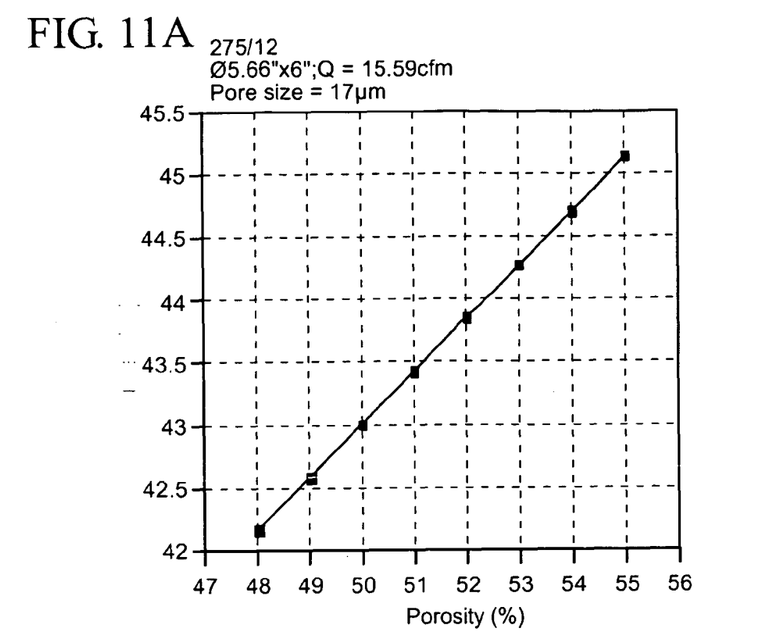
FIG. 11A shows results obtained from modeling data of clean filter efficiency as a function of wall porosity.

The sensitivity of initial (clean filter) filter efficiency to wall median pore size and wall porosity is demonstrated by the results shown in FIGS. 10A and 10B, and 11A and 11B respectively. In FIGS. 10A and 11A, a filter with a wall cell density of 275 cpsi and a wall thickness of 12 mils (275/12), a diameter of 5.66 inches and a length of 6 inches was modeled at a gas flow rate of 15.59 cfm (cubic feet per minute) at 25° C. As shown by FIG. 10A, when the wall median pore size is reduced from about 20 μm to about 14 μm, the initial filter efficiency for a particulate filter with a wall porosity of about 50% increases from about 34% to about 58%. As shown by FIG. 11A, when the filter's wall porosity increases from about 48% to about 55%, the initial filter efficiency for a particulate filter with a median pore size of about 17 μm increases from about 42% to about 45%. Initial filter efficiency is, therefore, shown to be relatively insensitive to an increase in wall porosity, but relatively sensitive to a decrease in wall median pore size, increasing appreciably with a decrease in wall median pore size.

Figure 11B:
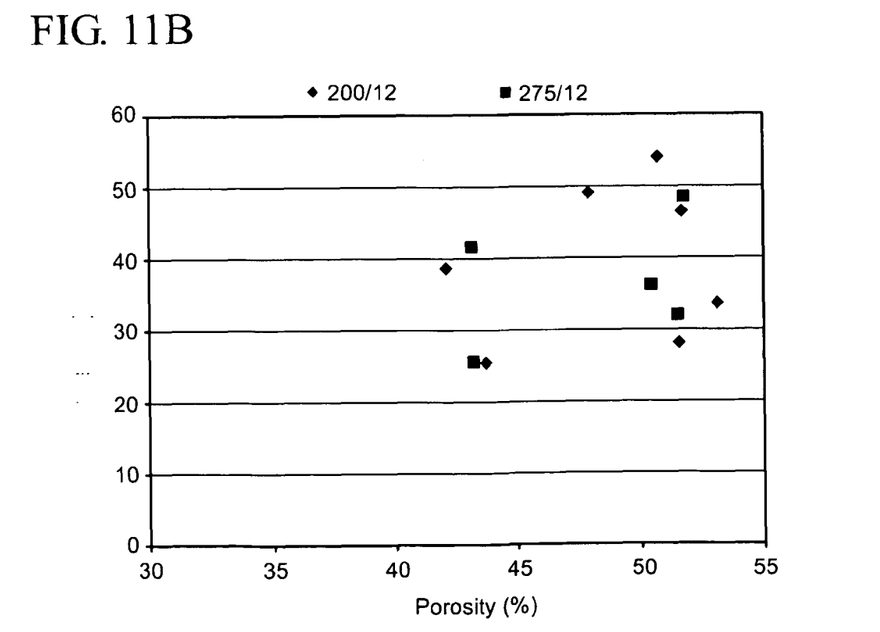
FIG. 11B shows results obtained from experimental tests of clean filter efficiency as a function of wall porosity.

Similarly, FIGS. 10B and 11B show results of experimental tests on filters with various combinations of wall cell density/wall thickness, i.e., 275 cpsi/12 mils (275/12 corresponding to the squares on the plots) and 200 cpsi/12 mils (200/12 corresponding to the diamonds on the plots), diameters of 5.66 inches and lengths of 6 inches tested at a gas flow rate of 15.59 cfm at 25° C. Confirming the modeled data, the 275/12 plot in FIG. 11B further illustrates that initial filter efficiency was relatively insensitive to an increase in wall porosity, while the 275/12 plot in FIG. 10B further illustrates that initial filter efficiency was relatively sensitive to a decrease in wall median pore size.

Figure 12:
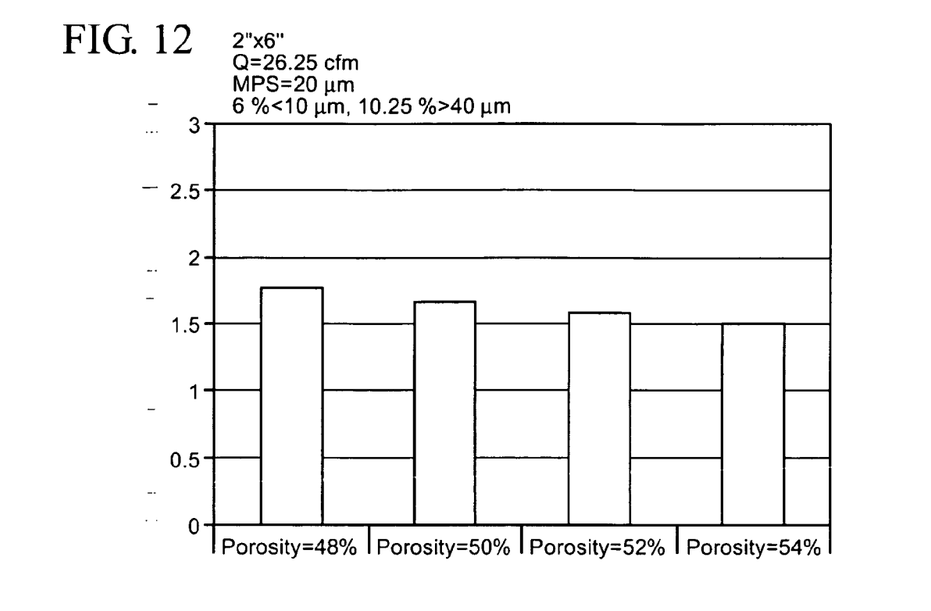
FIG. 12 shows results obtained from modeling data illustrating the influence of wall porosity on the slope of initial back pressure drop due to deep-bed filtration.

FIG. 12 shows the results obtained from modeling data illustrating the influence of wall porosity on the slope of initial back pressure drop due to deep-bed filtration. As illustrated in FIG. 12, for a particulate filter modeled at a gas flow rate of 26.25 cfm at 25° C., with a diameter of 2 inches, a length of 6 inches, and a median pore size of about 20 μm, wherein pores less than 10 μm contributed to about 6% porosity and pores greater then 40 μm contributed to about 10.25% porosity, initial pressure drop slope (measured on the y-axis) decreases with an increase in wall porosity from 48% to 54%.

Consequently, in an effort to achieve a desired pressure drop and filter efficiency behavior of a particulate filter, exemplary embodiments of the present teachings contemplate using structures comprising porous walls having a median pore size ranging from about 13 μm to about 20 μm, or about 13 μm to about 16 μm, which may result in a relatively high filter efficiency performance without a significant increase in the filter's clean pressure drop behavior. Furthermore, while clean pressure drop improves only modestly with increasing wall porosity, a larger wall porosity can also help to reduce the high initial back pressure that results from deep-bed filtration. Accordingly, the present teachings further contemplate using structures having porous walls with a total porosity greater than about 45%. Additional exemplary embodiments of the present teachings also consider particulate filters with porous walls having a total porosity ranging between about 45% and about 60% in order to account for the possible negative impacts on the filter's bulk density/thermal mass that can result from higher porosity levels.

Figure 13:
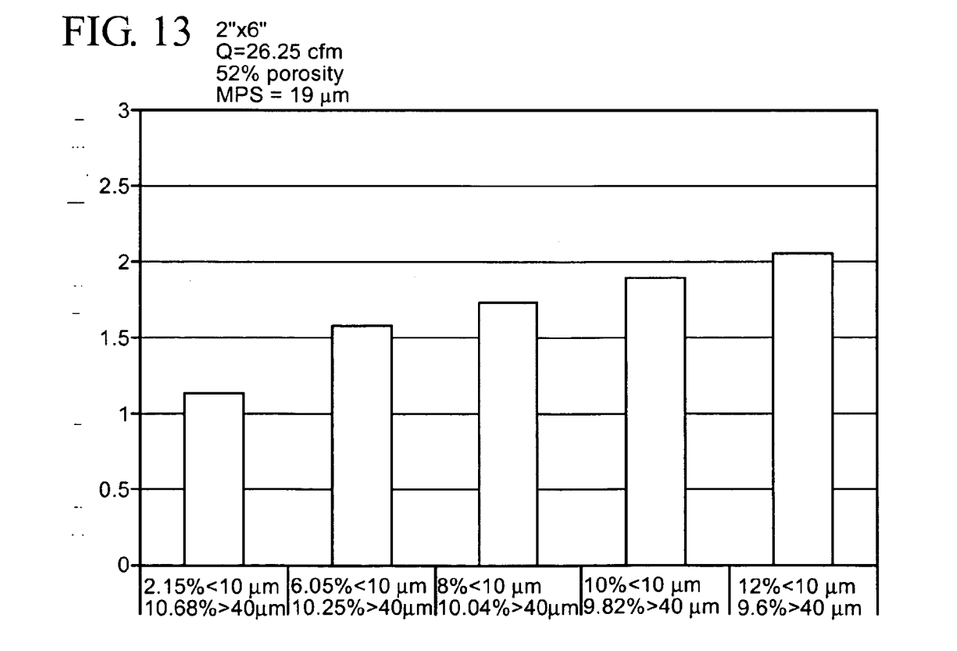
FIG. 13 shows results obtained from modeling data illustrating the influence of wall pore size distribution on the slope of initial back pressure drop due to deep-bed filtration.

FIG. 13 shows results obtained from modeling data illustrating the influence of wall pore size distribution on the slope of initial back pressure drop due to deep-bed filtration. As illustrated in FIG. 13, initial back pressure drop is relatively sensitive to the porosity that is contributed by pores with sizes less than 10 μm (fine pores as determined by mercury porosimetry technique). As shown, for a particulate filter modeled at a gas flow rate of 26.25 cfm at 25° C., with a diameter of 2 inches, a length of 6 inches, a median pore size of about 19 μm and a porosity of 52%, the slope of initial pressure drop during deep-bed filtration increases about 66% when the porosity contributed by pores of sizes less than 10 μm is increased from about 2.15% to about 12% (while the porosity contributed by pores of sizes greater than 40 μm is respectively decreased from about 10.68% to about 9.6% in order to maintain a constant median of the distribution.) Accordingly, providing a filter structure that has a pore size distribution such that pores less than 10 μm contribute less than about 10% porosity, for example, less than about 6% porosity, for example, less than about 2% porosity, can be desirable to help reduce initial pressure drop increase during the deep-bed filtration stage.

Those having ordinary skill in the art would understand that the results and corresponding geometrical and micro-structural properties shown and described with reference to FIGS. 4-13 are exemplary only and not intended to be limiting of the scope of the present teachings or claims. For example, the properties of the fluid stream entering the structure, such as, for example, temperature, pressure, concentration of contaminants and/or other substances in the fluid, and flow rate (both into, through and out of the system), may also present factors to consider to select a filter's geometric and microstructural properties in accordance with the present teachings. Accordingly, those skilled in the art will understand that the particulate filters and methods for regenerating the particulate filters of the present teachings may include a plurality of geometrical and micro-structural parameters that achieve a low clean pressure drop, a steep pressure drop response to particulate loading during the cake-bed filtration stage, and a low pressure drop response to particulate loading during the deep-bed filtration stage.

The following example represents a model particulate filter having various filter parameters and under various gas flow conditions that provides a low clean pressure drop, a low pressure drop response to soot loading (e.g., shallow slope of pressure drop versus soot loading) during deep-bed filtration and a high pressure drop response to soot loading (e.g., steep slope of pressure drop versus soot loading) during cake-bed filtration.

For a particulate filter having a 12 inch diameter, an 8 inch length, a wall thickness of 12 mils, a wall cell density of 200 cpsi, a wall porosity of 45%, and a median pore size of 19 μm, wherein pores less than 10 μm contribute 10% porosity, the following pressure drop and pressure drop responses were exhibited, in accordance with the present teachings, at exhaust gas conditions of a flow rate ($Q_{ref}$) of 1400 m$^3$/hr and temperature ($T_{ref}$) of 500° C.: a low clean pressure drop was 1.67 kPa (kilopascals), a deep-bed pressure drop at 0.05 g/L of soot was 1.84 kPa, and a cake-bed pressure drop at 1 g/L of soot (for a conditioned filter) was 2.57 kPa.

Further, a low pressure drop response to particulate loading of the particulate filter during the deep-bed filtration stage (the pressure drop response slope during the deep-bed filtration stage) was 3.4 (kPa/(g/L of soot), and a steep pressure drop response to particulate loading of the particulate filter during the cake-bed filtration stage (the pressure drop response slope during the cake-bed filtration stage) was 0.9 (kPa/(g/L of soot)).

With the same filter parameters and exhaust gas parameters as above with the exception of the filter having a pore size distribution where pores less than 10 μm contribute 6% porosity, a low clean pressure drop was 1.61 kPa and a deep-bed pressure drop at 0.05 g/L was 1.75 kPa. Further, a low pressure drop response to particulate loading of the particulate filter during the deep-bed filtration stage (the pressure drop response slope during the deep-bed filtration stage) was 2.8 (kPa/(g/L of soot)), and a steep pressure drop response to particulate loading of the particulate filter during the cake-bed filtration stage (the pressure drop response slope during the cake-bed filtration stage) was 0.9 (kPa/(g/L of soot)).

With the same filter parameters and exhaust gas parameters as above with the exception of the filter having a pore size distribution wherein pores less than 10 μm contribute 2% porosity, a low clean pressure drop was 1.55 kPa and a deep-bed pressure drop at 0.05 g/L was 1.66 kPa. Further, a low pressure drop response to particulate loading of the particulate filter during the deep-bed filtration stage (the pressure drop response slope during the deep-bed filtration stage) was 2.2 (kPa/(g/L of soot), and a steep pressure drop response to particulate loading of the particulate filter during the cake-bed filtration stage (the pressure drop response slope during the cake-bed filtration stage) was 0.9 (kPa/(g/L of soot)).

Using the scaling methodology and equations described below, however, the desired pressure drop response and associated filter geometry and microstructure can be scaled from any set of flow rate and temperature conditions. Thus, those ordinarily skilled in the art may determine use the scaling methodology below to determine a filter configured to achieve the low clean pressure drop, low pressure drop response slope during deep-bed filtration, and steep pressure drop response slope during cake-bed filtration.

The Euler number, Eu, and Reynolds number, Re are defined as:

$$Eu = \frac{\Delta P}{(\rho U_f^2 / 2)}; Re = \frac{\rho U_f D}{\mu}$$

Where ΔP is the pressure drop across the filter, ρ is the fluid (e.g., gas) density, D is the filter diameter, μ is the fluid (e.g., gas) viscosity and $U_f$ is the face velocity that can be calculated from fluid (e.g., gas) flow rate, Q, as:

$$U_f = \frac{4Q}{\pi D^2}$$

The Euler and Reynolds number at experimental and reference conditions are described as ($EU_1$, $Re_1$) and ($Eu_{ref}$, $Re_{ref}$), which enables the pressure drop measured at experimental flow and temperature conditions ($Q_1$, $T_1$) to be scaled to reference conditions ($Q_{ref}$, $T_{ref}$) using the following relations:

For soot load (SL)=0

$Eu_1 Re_1 = Eu_{ref} Re_{ref}$

For SL>0

$Eu_1 Re_1 SCF_1 = Eu_{ref} Re_{ref} SCF_{ref}$

Where SCF is the Stokes-Cunningham factor correction, which is a function of particulate layer pore Knudsen number, Knp, and is defined as:

$$SCF = 1 + Knp(1.257 + 0.4\exp(-1.1/Knp))$$

with the particulate (e.g., soot) layer pore Knudsen number is defined as:

$$Knp = \frac{L_{mfp}}{d_{particulate}} \left[ \left(1 - \left(\frac{(1-S\_vf)}{0.6}\right)^{1.71}\right) + 1.5 * \left(\frac{(1-S\_vf)}{S\_vf}\right)\left(\frac{(1-S\_vf)}{0.6}\right)^{1.71} \right]$$

where $L_{mfp}$ is the gas mean free path, $d_{particulate}$ is the particulate (e.g., soot) diameter, and S_vf is the solid fraction of the particulate (e.g., soot) layer.

Other characteristics of the particulate filters of the present teachings may also be altered as desired, including the materials used for the structures, the structural configuration (e.g., dimensions, shapes, etc.) of the channels, and/or properties of the fluid stream entering the structure, such as, for example, temperature, pressure, concentration of contaminants and/or other substances in the fluid, and flow rate (including into, through and out of the system). Ordinarily skilled artisans will understand that based on various parameters of the overall after-treatment system operation and of the fluid stream for which treatment is desired at least some of the various characteristics and features described above may be selected so as to help achieve a low clean pressure drop and a steep pressure drop response to particulate loading.

Overall, however, based on the present teachings, those having skill in the art would understand how to modify a filter's properties, including, for example, its geometric and microstructural properties, to achieve the desired high filter FE, low clean pressure drop, low pressure drop response to particulate loading during deep-bed filtration (if any) and a steep pressure drop response to particulate loading during cake-bed filtration, by utilizing the above disclosed scaling procedure and taking into consideration the various positive performance characteristics of the structural properties described herein in accordance with the present teachings.

Further, although various exemplary embodiments of the present teachings refer to particulate filters used to filter ash and soot particulate matter from automobile exhaust, the present teachings encompass a wide range of filters useful in various applications and for filtering various types of particulate matters. Exemplary applications include, but are not limited to, for example, filters for use in coal combustion power plants, gasoline engines, and for stationary and non-stationary applications.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to various exemplary embodiments thereof, it should not be considered limited to such, as numerous modifications are possible without departing from the broad scope of the appended claims.

We claim:

1. A particulate filter, comprising:
   an inlet end, an outlet end, and a plurality of channels disposed and configured to flow fluid from the inlet end to the outlet end,
   wherein the channels are defined by porous walls configured to trap particulate matter, the porous walls having:
   a cell density less than about 200 cpsi,
   a wall thickness of less than about 14 mils,
   a median pore size that ranges from about 13 micrometers to about 20 micrometers,
   a total porosity greater than about 45%, and
   a pore size distribution such that pores less than 10 micrometers contribute less than about 6% porosity.

2. The particulate filter of claim 1, wherein the particulate filter has a honeycomb structure.

3. The particulate filter of claim 2, wherein the porous walls are configured to trap soot.

4. The particulate filter of claim 1, wherein the cell density is less than about 150 cpsi.

5. The particulate filter of claim 1, wherein the total porosity ranges from about 45% to about 60%.

6. The particulate filter of claim 1, wherein the median pore size ranges from about 13 micrometers to about 16 micrometers.

7. The particulate filter of claim 1, wherein the pore size distribution is such that pores less than 10 micrometers contribute less than about 2% porosity.

8. The particulate filter of claim 1, wherein a ratio of length to diameter of the particulate filter is less than about 1.

9. The particulate filter of claim 1, wherein a ratio of length to diameter of the particulate filter is less than about 0.85.

10. The particulate filter of claim 1, wherein a ratio of length to diameter of the particulate filter is less than about 0.7.

11. The particulate filter of claim 1, wherein a ratio of length to diameter of the particulate filter corresponds to a space velocity greater than about 40 sec-1.

12. The particulate filter of claim 1, wherein a ratio of length to diameter of the particulate filter corresponds to a space velocity greater than about 70 sec-1.

13. The particulate filter of claim 1, wherein the plurality of channels are configured to flow engine exhaust gas.

14. The particulate filter of claim 1, wherein the particulate filter is a diesel particulate filter.

15. The particulate filter of claim 1, wherein the particulate filter comprises a ceramic material.

16. The particulate filter of claim 15, wherein the particulate filter comprises cordierite.

17. The particulate filter of claim 15, wherein the particulate filter comprises silicon carbide.

18. A particulate filter, comprising:
an inlet end, an outlet end, and a plurality of channels disposed and configured to flow fluid from the inlet end to the outlet end,
wherein the channels are defined by porous walls configured to trap particulate matter, the porous walls having a pore size distribution such that pores less than 10 micrometers contribute less than about 6% porosity, and
wherein the particulate filter is configured such that fluid flowing through the particulate filter at a temperature of 500° C. and fluid flow rate of 1400 m3/hr exhibits a low clean pressure drop from the inlet end to the outlet end that is less than or equal to about 1.7 kPa, a low pressure drop response to particulate loading of the particulate filter during a deep-bed filtration stage defined by a slope less than or equal to about 3.4 kPa/(g/L of soot density), and a steep pressure drop response to particulate loading of the particulate filter during a cake-bed filtration stage defined by a slope greater than about 0.9 kPa/(g/L of soot density).

19. The particulate filter of claim 18, wherein the low pressure drop response to particulate loading of the particulate filter during a deep-bed filtration stage is less than about 2.75 kPa/(g/L of soot density).

20. The particulate filter of claim 18, wherein the low pressure drop response to particulate loading of the particulate filter during a deep-bed filtration stage is less than about 2 kPa/(g/L of soot density).

21. The particulate filter of claim 18, wherein the low pressure drop response to particulate loading of the particulate filter during a deep-bed filtration stage is less than about 1.5 kPa/(g/L of soot density).

22. The particulate filter of claim 18, wherein the low clean pressure drop is calculated at differing exhaust gas temperatures and exhaust gas flow rates based on multiplying a Euler's number and a Reynold's number.

23. The particulate filter of claim 18, wherein the low pressure drop response to particulate loading of the particulate filter during a deep-bed filtration stage and the steep pressure drop response to particulate loading of the particulate filter during a cake-bed filtration stage are calculated at differing exhaust gas temperatures and exhaust gas flow rates based on multiplying the Euler's number, the Reynold's number and a Stoke-Cunningham correction factor.

* * * * *